United States Patent [19]
Wolff

[11] 3,879,728
[45] Apr. 22, 1975

[54] DIGITAL MAP MATCHING
[75] Inventor: Hanns H. Wolff, Matawan, N.J.
[73] Assignee: Maxson Electronics Corporation, New York, N.Y.
[22] Filed: Mar. 13, 1959
[21] Appl. No.: 799,267

[52] U.S. Cl. ......... 343/5 MM; 244/3.17; 340/146.2; 340/149; 343/7 ED
[51] Int. Cl. ....... G01s 7/04; G01s 9/02; G06f 15/50
[58] Field of Search ............ 343/7, 5, 5 MM, 7 ED; 244/14, 3.17; 340/149, 146.2, 23, 24, 27

[56] References Cited
UNITED STATES PATENTS

| | | | |
|---|---|---|---|
| 2,679,636 | 5/1954 | Hillyer | 343/5 MM |
| 2,753,552 | 7/1956 | Horn | 343/5 MM |
| 2,787,188 | 4/1957 | Berger | 343/5 MM |

Primary Examiner—Malcolm F. Hubler
Attorney, Agent, or Firm—Nolte and Nolte

EXEMPLARY CLAIM

1. In a map matching system wherein a live map is compared with a reference map, the steps of dividing said maps into predetermined numbers of live and reference area elements, respectively, assigning numbers to said area elements so that the numerical difference between the numbers assigned to any two elements of a single map is the same as that between the numbers assigned to any other pair of elements of that map which have the same relative position to each other as said two elements, selecting the live elements that have a predetermined characteristic, comparing the number assigned to said selected live elements with the number assigned to predetermined reference elements which are known to have said characteristic, and determining when the numerical difference between the number assigned to one of said selected live elements and the number assigned to one of said predetermined reference elements is the same as the numerical difference between the number assigned to another of said live elements and the number assigned to another of said predetermined reference elements.

5 Claims, 4 Drawing Figures

| 0099 | 0199 | 0299 | 0399 | | | 9699 | 9799 | 9899 | 9999 |
|------|------|------|------|---|---|------|------|------|------|
| 0098 | 0198 | 0298 | 0398 | | | 9698 | 9798 | 9898 | 9998 |
| 0097 | 0197 | 0297 | 0397 | | | 9697 | 9797 | 9897 | 9997 |
| 0096 | 0196 | 0296 |      | | |      | 9696 | 9796 | 9896 | 9996 |
|      |      |      |      | | |      | 9795 | 9895 | 9995 |
| 0004 |      |      |      | | |      |      |      |      |
| 0003 | 0103 | 0203 | 0303 | | | 9603 | 9703 | 9803 | 9903 |
| 0002 | 0102 | 0202 | 0302 | | | 9602 | 9702 | 9802 | 9902 |
| 0001 | 0101 | 0201 | 0301 | | | 9601 | 9701 | 9801 | 9901 |
| 0000 | 0100 | 0200 | 0300 | 0400 | | 9600 | 9700 | 9800 | 9900 |

DIGITAL MAP MATCHING

The present invention relates to the identification of a region or area on the earth's surface by the technique of matching a radar or other live map of the area with a reference map.

The problem of semi-automatically or full-automatically confirming the identity of the area represented by two maps, especially one which is the result of a momentary measurement (live map) and one which is based on earlier measurements (reference map) has been the subject of several technical solutions.

All prior solutions have been directed towards mechanizing the human process of comparing two maps. The human process of confirming the identity of two maps involves, however, in addition to mechanical steps, intuition and feeling, evaluation means which cannot be mechanized. Since equipment is only able to make decisions which have been anticipated by the designer and implemented in the decision mechanisms of the equipment, the present invention is directed towards a confirmation of identity method which is a strictly logical process and can therefore be implemented.

For purposes of better explanation it is assumed and this is also a feature of this invention, that the live map and the reference map are normalized, that is, they are brought into a condition (form and characteristic) which allows identifying corresponding areas as such.

To avoid a possible misunderstanding, it is noted that the term "map" is here and in the following used in a very broad sense, as "map" in connection with this invention means an evaluatable description of the "mapped" area.

It is, in fact, a feature of this invention that the description of the map consists of a number or an amplitude for a characteristic of the map and a number for the location of this characteristic.

As mentioned above the present invention is directed towards a confirmation of identity method, which uses a strictly logical process, and it includes equipment to exercise this method.

For this purpose the live map and the reference map are divided in accordance with this invention into corresponding fields.

For example, a rectangular map could be divided into 100 by 100 = 10,000 rectangular fields which may be called "map spots." Such a subdivision would be suited, for example, for a so-called "B-scan" radar map in which the abscissa corresponds to the azimuth, the ordinate to the range of the scanned area.

In case of a so-called "PPI radar scan" the subdivision could be also in form of rectangular spots or preferably in the form of sectors of annuli.

To each of these map spots a number is assigned which identifies the location of that map spot within the map uniquely.

By applying a special mathematical scheme in the selection of the assigned numbers it is possible to "match maps" by the use of a digital computer in a simple computation.

Each of these live map spots is characterized by a characteristic value, for example, its radar return in a radar sensor, its apparent temperature as measured by an infrared sensor, its noise characteristics in a radiometer receiver and other characteristics for other surveillance means, and is thereby distinguished from many other live map spots. The intensity of these characteristic values, for example, radar returns, or other characteristic like color covers a wide range and it is possible to compare the different intensity levels or other characteristics of the live map spots with the intensity levels or other characteristic of reference map spots.

Since, in general, the area forming a spot may contain besides one or more high intensity targets also targets of low intensity, the total intensity of such a spot could make it less distinguishable than an evaluation only of the maximum intensity appearing in this spot area.

It is, therefore, a feature of this invention, to use only the signal originating from the maximum signal point inside the spot for the matching process.

If the live map is produced by a radar as sensor, the reference map is preferably also a radar map taken under the same environmental conditions and from the same position.

Though it is possible to compute a "transfer function" which "normalizes" a radar map to some chosen standard, the airborne computation in accordance with this invention is preferably limited to unavoidable calculations (such as live or reference map conversion to height conformity between live and reference map) and the major normalization process is performed on ground.

For this purpose the live data and the reference data are "normalized." To the maximum return of the live scan, for example, the relative intensity "100" is assigned. The intensity levels of the other live map spots are evaluated accordingly ranging between 0 and 100, or the average intensity of the whole map is used as a reference (which may be called, for example, "50") and the individual live map spot returns are evaluated based on this standard as $50 + P$ and $50 - P$. The reference data are normalized accordingly.

The location data of the live map spots and their intensity identifications (for example, normalized amplitudes) which describe an area for map matching purposes sufficiently uniquely are then stored in accordance with this invention in a storage device, for example, a magnetic drum or magnetic tape. In the same way the reference data of location and intensity (for example, normalized amplitude) of the reference map spots are stored.

A digital computer is then used to find the relative position of corresponding live and reference spots.

The invention will be understood from the following description and the accompanying drawing in which.

Figures 1, 2:
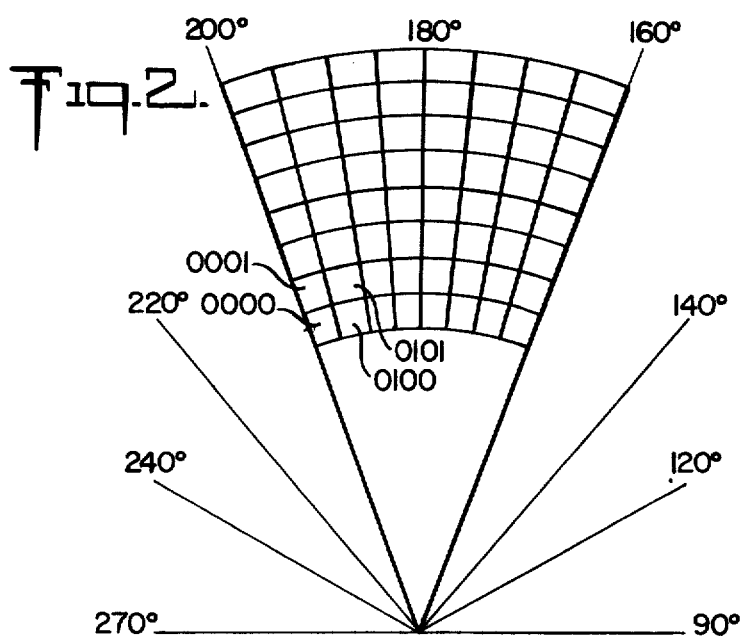
FIG. 1 shows a subdivided rectangular map field.
FIG. 2 shows a subdivided map field corresponding to a PPI radar scan.

In accordance with this invention in a method for automatic map matching the location of a map spot is described by a number, all map spot numbers are selected through a first algebraic equation and live and reference spots appearing in corresponding positions on their "field" (these are live and reference spots which in general represent different area spots) have numbers which are associated by a second algebraic equation. According to a further feature of this invention, the first algebraic equation is a linear equation which assigns one set of digits to the ordinate location of the spot, another set of digits to the abscissa location of the spot. In accordance with another feature of this invention the second algebraic equation is linear.

These concepts may be explained with reference to FIG. 1. A rectangular map field is shown which is subdivided into horizontal and vertical strips which form rectangular subdivision "spots." The field in this case is subdivided by 100 horizontal and 100 vertical strips, such that 10,000 spots result from this subdivision. To each of these 10,000 spots a 4-digit number is assigned, in this case such that vertically neighbored spots differ in their number by 1, progressing, for example, from bottom to top.

A further characteristic of the assigned number is that horizontally neighbored spots differ in their assigned number by 100, progressing in this example from left to right.

A 4-digit number describes, therefore, in this scheme, the location of a spot uniquely and the algebraic differences of the two pairs of sets of digits (or "horizontal" and "vertical" digits; as they may be called) forming the assigned numbers of two spots describe precisely their relative position.

For example, to proceed from spot number 0296 to spot number 9703 the "travel order" would be, 97—02=95 steps to the right and 03—96=—93 steps upwards, that is, +93 steps downwards.

Assuming that the map is subdivided into 100 × 100 = 10,000 spots, each spot location can be described by a 14-digit binary number.

This system, however, does not fully utilize the capabilities of a 14-digit binary word.

If a simple evaluation (computation) of the relative position of two identical relatively shifted sets of spots is desired the numbering system has to be chosen such that the difference in the numbers assigned to the spot locations of a map is such that the difference of all pairs of corresponding spots is constant. The decimal system is such a system which permits assigning numbers to each map location such that the difference of the spot number of all pairs of corresponding spots is constant for a final development.

However, since the assigned spot number consists of actually two components, in the case of a rectangular subdivision, i.e., of the vertical and the horizontal component and since a binary digital computation is much easier to perform than a decimal computation, it is preferable to use a binary code for the vertical and a binary code for the horizontal displacement. The spot number would then be a word consisting of two binary numbers, in other words the number assignment is in a binary code. Such a distribution has the advantage that horizontal and vertical displacement computation can be executed simultaneously. Using a total of 14 digits, that is, 2 × 7 digits a spot network of 128 × 128 = 16384 spots can be handled instead of the 10,000 spots accessible to a decimal distribution.

dially in steps of 1 and angularly in steps of 100.

If now, in accordance with a further feature of this invention, the number assignment of the subdivided live map and the numbers assigned to the subdivided reference map are associated by linear equation, for example, field position-wise corresponding spot numbers of live and reference maps differ by a constant, for example, zero. The lower left hand corner spot of the momentary live map has in this example the same number as the lower left hand corner spot of the reference map.

It shall be assumed for further explanation that live and reference maps are in directional alignment, that is, the parallelism of the north-south directions in both maps is established and a rotation of one of the maps for matching is not required. Such a condition is accomplished by a so-called heading reference, airborne equipment which indicates a specific direction in space independent of air carrier movements.

It can be readily seen that under these circumstances a mis-match between live and reference map requires only a parallel shift in horizontal and vertical directions to "match" the two maps.

If there is now in the map only one outstanding spot, that is, for example, only one spot with a high radiation return, it is obviously easy for a computer (or counter) to find the location number of this high spot in the live map and its location number in the reference map, and a subtraction of the "horizontal" and "vertical" digits (this expression includes "radial" and "angular" digits analogously) of these two numbers in the computer supplies readily the "mis-match" information (degree of horizontal and vertical or radial and angular mismatch) which is required, for example, to control the auto-pilot of the aircraft or missile such that the carrier is guided such that the live map is gradually changing into "match" with the reference map.

The problem is, in practice, of course, more complicated, for in general, more than one outstanding spot is recorded in the live and reference maps.

The first step in this general case could be to select a certain number of maximum intensity live spots (which may have coordinates $X_1 Y_1, X_2 Y_2, X_3 Y_3, \ldots$), for example, 5, and about the same number of maximum intensity spots from the reference map (which may have the coordinates $V_1 W_1, V_2 W_2, V_3 W_3, \ldots$) and then compare their relative position, preferably in a digital computer.

The computer would form
$V_1 - X_1$ and $W_1 - Y_1$,
$V_2 - X_1$ and $W_2 - Y_1$,
$V_3 - X_1$ and $W_3 - Y_1$,
... and store the results.

The computer would form then $V_1 - X_2$ and $W_1 - Y_2$ store the result and compare with the first set of stored results. It would continue to compute $V_2 - X_2$ and $W_2 - Y_2$, store the result and compare with the first set of results, and would continue to do so until it finds two pairs of live-reference map spots which have the same

| | | | | |
|---|---|---|---|---|
| 2 × 6 = 12 | digits permit | a 64 × 64 | = 4096 | spot subdivision |
| 2 × 7 = 14 | do. | a 128 × 128 | = 16384 | do. |
| 2 × 8 = 16 | do. | a 256 × 256 | = 65536 | do. |

FIG. 2 shows the subdivision for the live map (and correspondingly a reference map) which is especially suited for a so-called "off-center PPI-scan." Here, the spot numbers can, for example, as shown, progress rarelative position "V/W — X/Y."

If, for example, the live map spots $X_1Y_1$ and $X_2Y_2$ represent two area spots which are also represented by two of the reference map spots, for example, $V_4W_4$ and $V_7W_7$, respectively, the relative position of $V_7W_7$ to $X_2Y_2$ is equal to the relative position of $V_4W_4$ to $X_1Y_1$.

As soon as the equality of the relative position of two pairs of live-reference map spots has been established, a computer will try to find one or more further pairs of live-reference map spots, which have the same relative position to increase the reliability of the measurement.

If the reliability of this measurement (as given by the preselected minimum number of match pairs) has been established the computer will give the necessary control signal to the auto-pilot to guide the aircraft such that the live map will gradually shift into the preselected "match" with the reference map.

If the live map spot $X_1Y_1$ appears to be an unexpected high intensity spot, since none of the live map spots $X_2Y_2$ and $X_3Y_3$ can be found to form a live-reference map spot pair which has an equal relative position, as $X_1Y_1$ has with respect to any of the reference map spots, the live map spot $X_1Y_1$ is eliminated (at least temporarily, since its failure to give the necessary relative position may be due to the fact that it is outside the area covered by the reference map or that it is originating from an unreferenced landmark or a jammer.)

The sequence of the steps the computer has to go through to match two maps can be programmed in advance entirely independent of the live information signals, though it is, of course, possible also to have the live signals have an influence on the programming itself.

For in one case it may be advantageous to compare X and Y coordinates in immediate sequence, in another case it may be preferable to have at first only a satisfactory X or Y match established before the second coordinate match is performed.

Also depending on the individual map it may be desired to match other than high intensity signals first, for example, very low returns first, if these can be matched faster and if they are more significant.

Since it is possible (especially if the live map scanning is not performed in a step function but continuously and also, especially if the "spot width" is small) that a target signal will appear in two (or even more) neighboring spots the computer is programmed so that not only a "perfect" match of pairs of live and reference map spots is registered as match, but also a deviation by one spot width from a perfect match is registered as a match.

According to a further feature of this invention in such an "approximate match" system a further programmed computation step will decide which match has the highest probability of being the correct match.

As far as the height or radial length of a spot is concerned similar conditions prevail. Here the pulse width and repetition rate, in case a radar sensor is used, control the uncertainty of the location of a target in the spot subdivision system and similarly as described for the horizontal or angular coordinate an "approximation match" may be provided for the vertical or radial coordinate.

Figure 3:
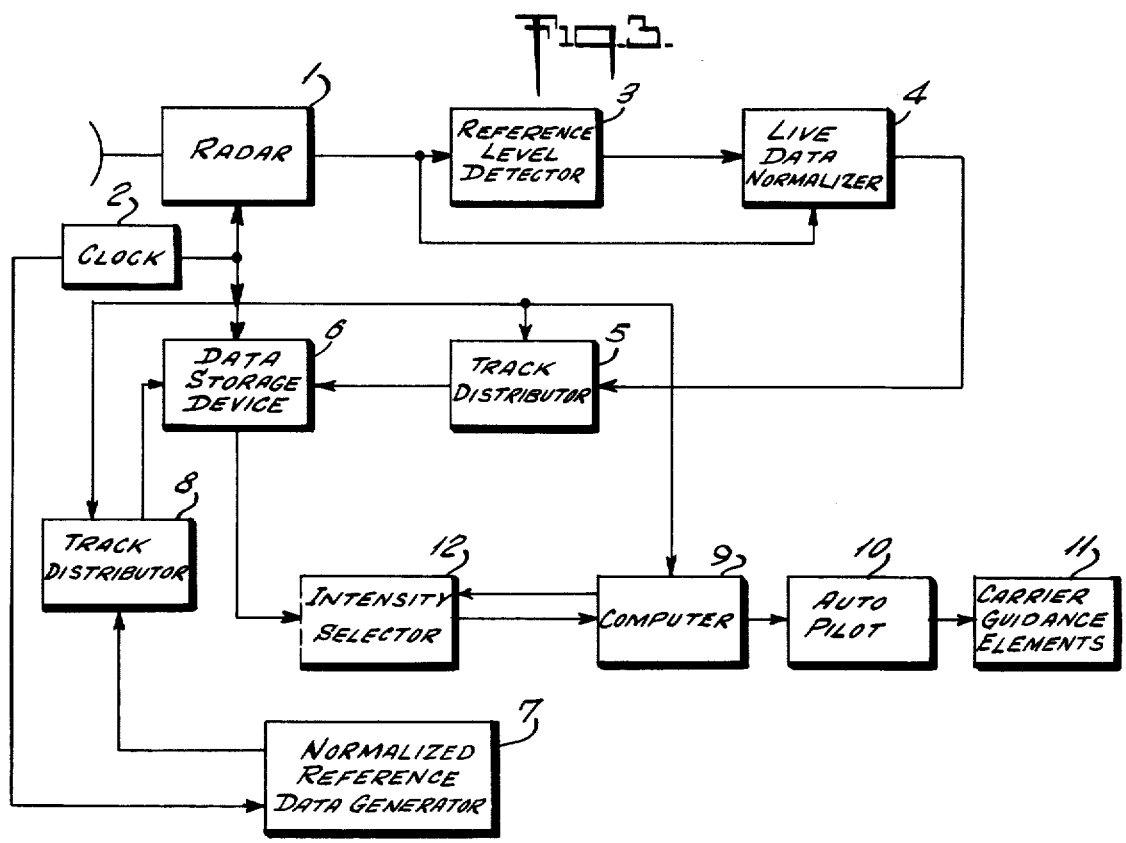
FIG. 3 is a block diagram of a radar map matching system according to the invention.

An embodiment of this invention is shown in FIG. 3. Here a radar set 1, preferably an inertialess scanning radar system, which scans an area and whose scanning system may be controlled by a clock generator 2, supplies live data to a reference level detector 3 and a live data normalizer 4. The reference level detector is, for example, a peak voltmeter which measures the maximum amplitude of all live data of a scan. In accordance with this measurement (the highest peak) all the live data of the following scan are correspondingly graded by normalizer 4. The normalized live data are then recorded through a track distributor or storage selection circuit 5 on that spot of the data storage device 6, for example, a drum, which is assigned to the spot location on the live map from which the respective normalized live data originated.

Similar equipment, consisting of a normalized reference data generator 7 and a track distributor 8, supply reference data. Generator 7 may contain a scanner to scan photographic recorded data maps or any other kind of recording, a data normalizer, data storage device and other pertinent components, and also the track distributor 8 can be ground based. In this case the reference data are transposed to the data storage device 6, preferably before the flight though it is also possible to change over a radio channel the recorded reference map and substitute another reference map, or the reference map can be transposed during the flight if that is desired.

The data stored in the data storage device 6 are then scanned by a computer 9 which compares the different combinations of live and reference map spots of matching intensity with regard to their "horizontal" and "vertical" digit difference and the computer supplies then as soon as the degree of horizontal and vertical mismatch has been established corresponding error signals to the autopilot 10 which controls the guidance elements 11 of the carrier.

The system described so far uses a number of high intensity live spots to confirm the identity of the area represented by two maps, but further intensity level data can be used also for a map comparison.

If only spots are used for the map matching process which are characterized by a predetermined minimum signal, no digit for the characteristic of such a spot is needed.

If, however, different intensity levels are used additional digits are required. One intensity digit can be used, i.e., to signify the existence of a minimum signal of say 80% or of less than 80% of the highest spot intensity found in the whole map. If more intensity levels shall be used, more binary digits are required. Two binary digits could, for example, describe a spot intensity as being in the 0 to 10, 10 to 45, 45 to 80 or 80 to 100% range of maximum spot intensity.

An intensity selector 12 (see FIG. 3) is then used to select, upon instructions from the computer, only spots of a certain selected group.

Often, especially in missile guidance applications, the map matching process has to be performed in a very short time, which does not allow going through a large number of steps, especially not through comparing spots of a large variety of intensities. In such a case only high intensity spots are evaluated or in a more refined system, high intensity spots and spots of extremely low intensity (low return in the case of radar).

Such a system may operate in the following way. The operator selects from a map of the target area, a number of points which appear to be well recognizable spots, either as of high intensity or as of very low intensity. These spots are then recorded in the data storage device 6 (FIG. 3) with information regarding high or low intensity. In binary digits, for example, a "2" could be used to represent high, a "1" to represent low intensities.

Reference level detector 3 and live data normalizer 4 are in this case adjusted so that only live signals, for example, of at least 80% maximum intensity are recorded and used for the matching process.

This principle has the advantage that even areas which do not have very discriminative landmarks can be defined well enough to make a matching between live and reference maps possible. It has, furthermore, the advantage that only the preselected reference spots have to be recorded and live spots only of one or two intensity levels have to be checked against these selected spots.

The checking process may consist, for example, in finding automatically, two high return live spots and determine then if these can be matched in their relative positions to a pair of high intensity reference spots. If they do, other reference spots are used to find if corresponding live spots exist and if a sufficient number of spots match (as pre-defined by the confidence level selected by the operator) the proper error signal is given to the auto-pilot.

If the first two live spots cannot be matched or the succeeding test of further data comparison fails, a third high intensity live spot is automatically selected which replaces first one and then, if necessary, the other of the first pair of live spots, or (in case the failure of the matching test occurs in the succeeding cycle establishing the confidence level) two new live spots are selected and the process is renewed.

If only high intensity signal map matching is intended the reference map spot numbers only have to be compared with the recorded live data, that is, those spots which have an amplitude of at least the predetermined minimum.

If, however, different signal level map matching is intended the map matching process is accomplished in groups; in two groups, for example, if an 80–100% and a 0–10% relative signal intensity map matching is performed, in four groups if a 0–10, a 10–45, a 45–80 and an 80–100% relative signal level map matching is intended.

To take care of slight variations in case of border line intensities the recording would preferably be done in overlapping groups such that border line signals are registered in two different groups, for example, 0–11, 9–50, 40–85 and 75–100%. To explain the map matching process, it is, therefore, only necessary to explain it for a given intensity group.

Assuming that the reference map contains a number of outstanding spots of intensity levels between 80 and 100% the operator selects, for example, three spots (primary reference spots) which must appear in the live map recording. The relative position of these three spots is defined by two differences, which have to be recorded.

The computer then has to go through a series of subtractions of the live data to find two corresponding equal differences and as soon as these have been established, further reference spots and live data are used to increase the probability that the first found three live spots are the ones corresponding to the selected basic reference spots.

As soon as the identity of this spot group has been established to the desired probability, the difference between any one pair of reference-live spot numbers is the direct measure of the mismatch.

It is, of course, necessary to select the reference map spots especially the first three spots such that they are not too close to the edge of the map so that the corresponding live data are recorded even if considerable mismatch exists.

All these steps have, of course, to be prerecorded on the data storage device 6 or another storage device inside the computer 9 which is programming the sequence of steps through which the computer analyzes the live and reference data stored in the data storage device.

In the foregoing it has been assumed that the live and reference maps are exactly in parallelism by the use of a heading reference or another equivalent instrument. Since, however, the heading reference will have an error it is advisable, and this forms a feature of this invention, to select the live spot width so that the scanned point falls into the spot area of the live spot even if the heading error has its maximum value.

If, for example, the error in heading reference is $\Delta \alpha$ and the antenna beam width is $\theta$, the spot width shall be in accordance with this invention in the order of $\theta + 2\Delta\alpha$ or larger.

This is especially advantageous if the area represented by a map spot is relatively large, that is, the map is subdivided only into a few hundred spots or less. In this case it is advisable to use an inertialess scanning radar system which permits jumping of the scan direction from one row of spots to the next, thereby, avoiding overlapping of scanned areas and avoiding loss of scanning time.

In this case the clock 2 (FIG. 3) would control the jumping of the antenna beam direction.

The recording of mapping data on the data storage device can be performed in different ways. Either for each map (live and reference) spot a specific recording spot is provided, for example, on the drum where the intensity, high or low, is recorded so that the recording of a spot characteristic can always be found by location in the recording means or the spot number is recorded with (for example, followed by) the "intensity number." The first system is advisable if a large number of spots (especially sequential) is used, whereas the second method, which, of course, requires more recording "area" than the first one is preferable, if only a small number of spots (especially non-sequential) are recorded. In this case a recording area is provided where the spots are recorded with location and characteristic number in any desirable arrangement.

Whereas only a limited number of reference data are used in this system, often a large number of live data have to be stored for the map matching process.

To save storage space it is, therefore, desirable to store the reference data by their location number and their intensity code preferably in a storage area which is provided for the reference data, and store the live data intensities only, whereby for each spot of the live map a specific recording area is provided.

From the equipment described and shown in FIG. 3, it can be readily understood by one skilled in the art of digital computers, how the signals originating from a sensor, in this case a radar 1, are automatically coded and recorded.

However, the coding of reference data as symbolized by the normalized reference data generator 7 may require some explanation. Two basically different possibilities exist: automatic coding and "manual" coding.

Figure 4:
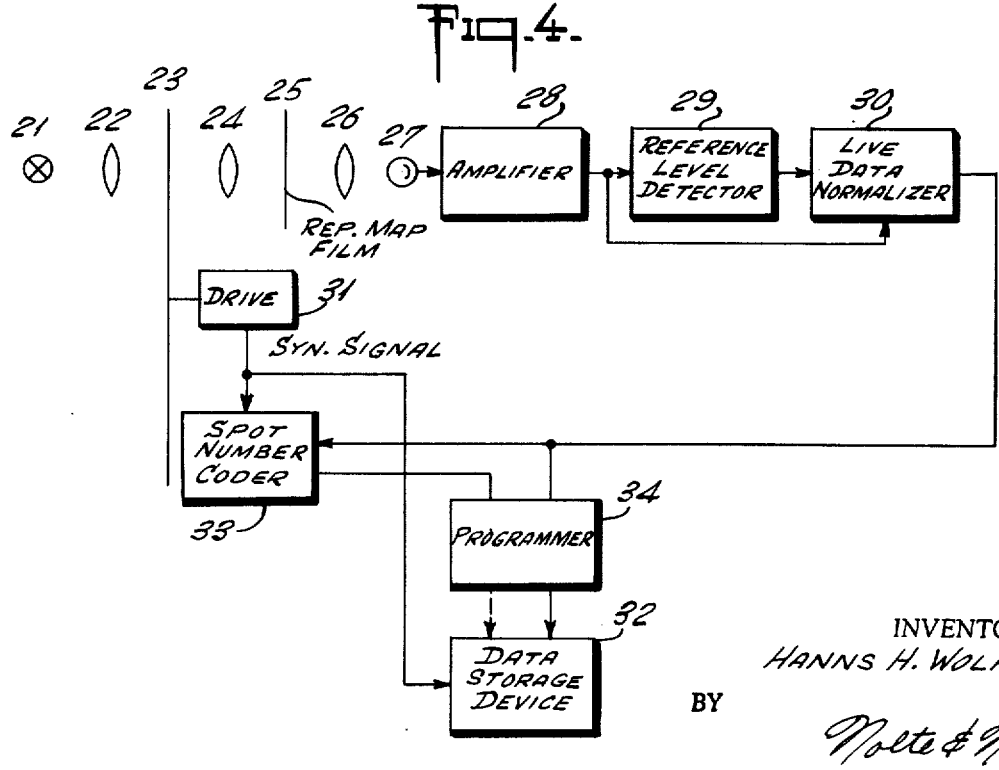
FIG. 4 is a block diagram of a reference map scanner and coder.

The automatic coding can, for example, be performed by the use of equipment known in the art of television scanning modified to meet the specific needs of map coding. It shall be assumed that a physical reference map in the form of a film is available which shows a picture in proportional dimensions and intensities to the map the live map sensor is sensing. An automatic coder for coding such a "basic reference map" is shown in FIG. 4.

A light source 21 sends light through a lens system 22 to scanning means 23 which may be a Nipkow-disk type or rotating mirror type scanner producing a scanning light beam, which scans through an optical system 24 the basic reference film 25. The momentary scanned part of the film 25 is then projected through a lens system 26 onto a photocell 27, amplified in an amplifier 28 and processed in a reference level detector 29 and a live data normalized 30 in the same way as described above for live map coding.

The scanning mechanism 23 is driven by a drive unit 31 which is simultaneously generating synchronizing signals, for example, pulses, which synchronize the data storage device 32 so that the live data are recorded on the proper spot of the data storage device.

Corresponding equipment for an opaque basic reference map using the reflected light originating from a scanning light beam can be used, if desired.

Instead of mechanical scanning means as shown in FIG. 4 electron-optical means like iconoscopes or other photo-electric storage and scanning devices like orthicons can be used.

In the foregoing it was implied that all map spots are coded by location. If, however, only selected data, for example, high intensity spot data are recorded, a spot number coder 33 is used which upon a high intensity signal from the live data normalizer 30 sends out the number code of the high intensity spots and records this number, for example, in binary digits on the data storage device. To store these irregularly incoming signals properly (especially in a provided storage space) a programmer 34 is provided which may also contain a storage device for programming instructions and for intermediate storage of coded data information.

If manual coding is desired, the normalized basic reference map, for example, a photographic reproduction of the sensor "view," is subdivided into map spots, for example, by a transparent overlay of a subdividing grid, and the programming officer selects the desired number of spot numbers of high intensity signals and if desired also the desired number of low intensity spot numbers (that is, spots from which no high intensity signal is anticipated). Then, for example, by means of a push button arrangement, these spots and their signal intensity levels are coded in a digital computer and stored on the airborne map matching equipment data storage device or if desired on a ground based intermediary storage device.

What is claimed as new and desired to be secured by Letters Patent is:

1. In a map matching system wherein a live map is compared with a reference map, the steps of dividing said maps into predetermined numbers of live and reference area elements, respectively, assigning numbers to said area elements so that the numerical difference between the numbers assigned to any two elements of a single map is the same as that between the numbers assigned to any other pair of elements of that map which have the same relative position to each other as said two elements, selecting the live elements that have a predetermined characteristic, comparing the number assigned to said selected live elements with the number assigned to predetermined reference elements which are known to have said characteristic, and determining when the numerical difference between the number assigned to one of said selected live elements and the number assigned to one of said predetermined reference elements is the same as the numerical difference between the number assigned to another of said live elements and the number assigned to another of said predetermined reference elements.

2. A map matching system according to claim 1, wherein said live map is formed by means of a reflected signal and including the step of selecting an intensity level of the reflected signals as said characteristic.

3. An automatic map matching system for comparing a live map of a given region with a reference map, said reference map being divided into a predetermined number of area elements having numbers assigned thereto, whereby the numerical difference between the numbers assigned to any two elements is the same as that between the numbers assigned to any other pair of elements which have the same relative position to each other as said two elements, comprising means for storing information relative to the numbers of those elements which have a predetermined characteristic, means for scanning a region and producing a live map thereof, said live map being subdivided into live area elements having numbers assigned thereto in the same manner as does said reference map, and computer means for determining the numerical difference between the numbers assigned to those live elements which have a predetermined characteristic and the numbers assigned to said stored reference elements.

4. A map matching system according to claim 3, including means for indicating when the numerical difference between the numbers assigned to two of said live elements having said predetermined characteristic and the numbers assigned to two of said stored reference elements, respectively, is the same.

5. A map matching system according to claim 4 wherein said characteristic is related to a signal reflected from said region, and including an intensity selector for selecting a level of the reflected signal as said predetermined characteristic.

* * * * *